E. BOEHNKE.
SLIDE RULE.
APPLICATION FILED MAR. 19, 1919.
1,378,993.
Patented May 24, 1921.
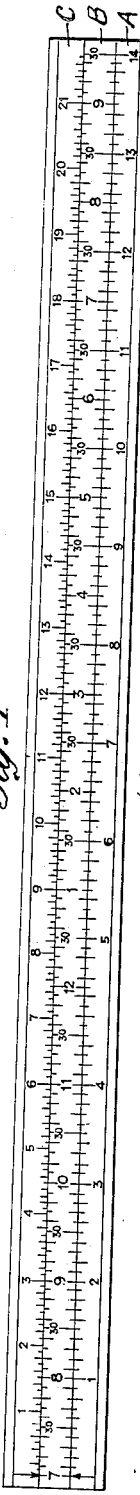
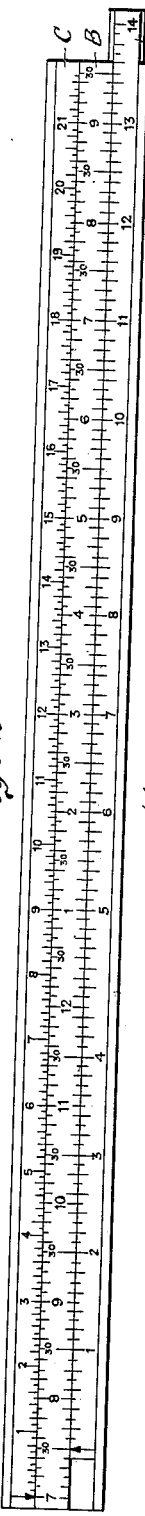
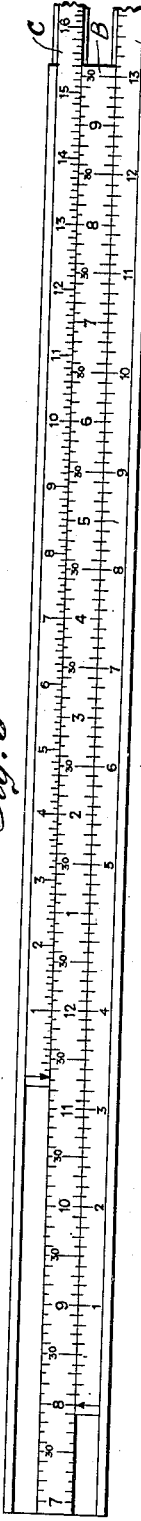
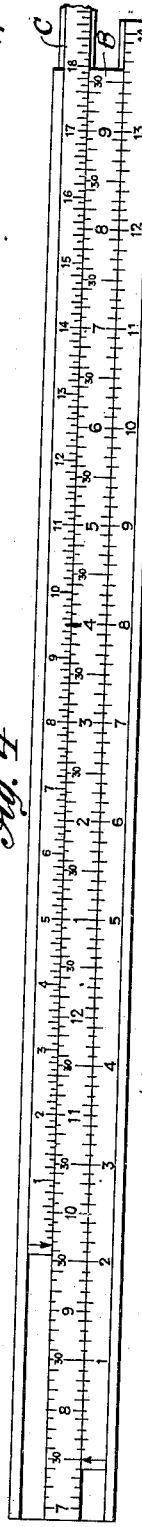
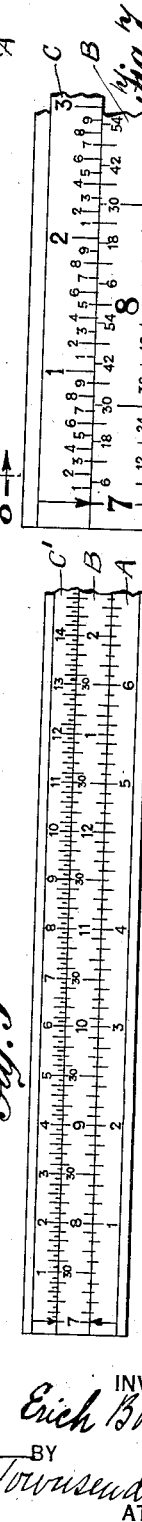
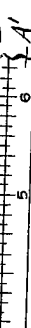
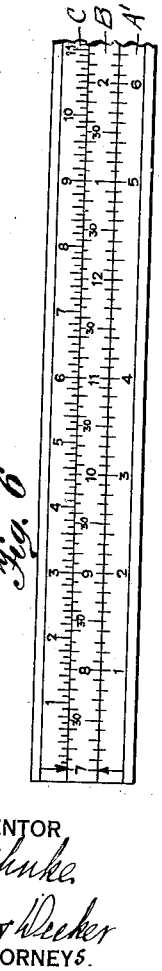
INVENTOR
Erich Boehnke.
BY
Townsend & Decker
ATTORNEYS.

UNITED STATES PATENT OFFICE.

ERICH BÖHNKE, OF BROOKLYN, NEW YORK.

SLIDE-RULE.

1,378,993.  Specification of Letters Patent.  Patented May 24, 1921.

Application filed March 19, 1919. Serial No. 283,523.

*To all whom it may concern:*

Be it known that I, ERICH BÖEHNKE, a citizen of the United States, and a resident of Brooklyn, in the county of Kings and State of New York, have invented certain new and useful Improvements in Slide-Rules, of which the following is a specification.

My invention relates to slide or calculating rules and has for its object the production of a slide or calculating rule of simple construction by means of which the number of hour's work with which a workman or shopman is to be credited on any given day in order to determine the amount to be paid him may be quickly and easily calculated.

Other and further objects of my invention will appear from the following description, the invention consisting in the novel slide or calculating rule hereinafter more particularly described and then specified in the claims.

In the accompanying drawings:

Figure 1 is a plan view of my improved slide rule.

Fig. 2 is a view similar to Fig. 1 showing the lower slide in a different position.

Figs. 3 and 4 are views similar to Fig. 1 showing the upper and lower slides in different positions.

Fig. 5 is a modification showing units on the upper slide of shorter length than in the preferred form of the invention.

Fig. 6 is a modification showing one of the units on the lower slide of larger length than in the preferred form of the invention.

Fig. 7 is an enlarged view of a portion of the slide rule.

Fig. 8 is a vertical cross-section on the line 8—8 of Fig. 7.

As is well known, in many factories and shops, the employees are paid a certain amount per hour for the number of hours or fractions thereof they have actually worked during the day. They are required to "punch" a time-clock or their time is noted when entering or leaving and the number of hours and minutes to be credited to them is then calculated. This becomes a simple matter when the employee enters and leaves at an "even" time for instance when he enters at 8:00 a. m. and leaves at 5:00 p. m. but it becomes more difficult when he enters and leaves at "odd" times for instance if he should enter at 7:56 a. m. and leave at 4:42 p. m. the arithmetic, to figure out the amount due him based on the number of hours and minutes he has worked, is more complicated. In these cases my improved slide rule becomes exceedingly useful for the reason that the figure to be calculated may be easily and expeditiously determined irrespective of the time the employee enters or leaves.

Another factor for which my slide rule makes provision is the recess or lunch-time in the middle of the day, usually a half hour, for which the employee is not paid and which ordinarily must be deducted from the total number of hours and fraction thereof that the employee is in the shop. In my improved slide rule this recess or lunch-time is automatically deducted from the total number of hours the employee is in the shop and the number of hours with which he is to be credited is correctly calculated.

A still further factor for which my slide rule makes provision is "overtime." In most shops and factories employees are paid an additional amount for work done after the usual closing hour which is ordinarily 5 p. m. or 6 p. m. In most cases they are credited with one and one-half times the number of hours and factions thereof worked after the closing time although in some cases they are credited with "double time." As an example, if the employee was credited with a time and one-half for overtime and he worked after hours from 5 p. m. until 7 p. m.; assuming 5 p. m. to be closing time, his overtime would amount to one and one-half times two hours, or three hours, to be credited for work done after 5 p. m. "Overtime" as in the case of "regular" time is ordinarily easily calculated if the employee stops work at an "even" time, as for instance at 7 p. m. in the above example, but become more difficult if he stops work at an "odd" time for instance 7:22 p. m.

An example which ordinarily would require considerable arithmetic is as follows:

Assuming the employee's ordinary day is from 7.30 a. m. to 5 p. m. with half an hour allowance for lunch without pay and time and one-half credited for work done after 5 p. m., if the employee begins work at 7.43 a. m. and ceases work at 6:52 p. m. he is credited with 11 hours and 35 minutes for the day. This is calculated as follows:

Ordinary time: 7:43 a. m. to 5 p. m.=9 hrs. 17 min.

Ordinary time minus one-half hour deducted for lunch=8 hrs. 47 min.

Time worked after 5 p. m.: 5 p. m. to 6:52 p. m.=1 hr. 52 min.

Overtime credited (1 hr. 52 min.×1½)=2 hrs. 48 min.

Total time credited (ordinary time—lunch-time=8 hrs. 47 min.+overtime=2 hrs. 48 min.)=11 hrs. 35 min.

By means of my improved slide rule the above example could be easily and quickly solved as will readily appear from the following explanation of the invention:

Referring in detail to the several figures of the drawings and more particularly to Figs. 1 to 4 inclusive and to Figs. 7 and 8:—

A indicates the lower or "regular time" scale of my improved slide rule which is preferably movable and is so constructed as to slide longitudinally in grooves as in the case of an ordinary slide rule. Said scale is divided into equal units, in the present case numbering 1 to 14 to indicate hours, with the exception of the unit intermediate figures 4 and 5 the distance of which if so desired may be made equal to one and one-half times any of the other units. Said main units are preferably further sub-divided into tenths or into other sub-divisions of equal length which indicate fractions of an hour.

B indicates the middle or "clock" scale of the slide rule which is preferably "fixed" and which is divided and sub-divided into units equal in length to the units of scale A with the exception that scale B has no single unit of different length than its other units as is the case with the unit intermediate numerals 4 and 5 of scale A as has hereinbefore been explained. The large numerals on scale B indicate the hours of the day and the small numerals "30" half-hours. As illustrated, scale B therefore represents a clock beginning with 7 a. m. at the extreme left and ending 9:30 p. m. at the extreme right although these limits have been arbitrarily fixed merely for the purpose of illustration and may be extended if so desired.

C indicates the upper or "overtime" scale which is also adapted to slide longitudinally in grooves the same as in the case of scale A. Scale C is divided into equal units indicating hours and numbered 1 to 21 in the present case, said equal units being further sub-divided into tenths or other equal sub-divisions. The length of the units of scale C is equal to two-thirds of the length of the units of scales A and B, the ratio therefore between the length of the units of scales C and B or C and A being 2 to 3.

To compute the regular time with which an employee is to be credited, the arrow on the lefthand end of scale A is brought into alinement with the hour on scale B at which the employee begins work and the number of hours with which he is to be credited, assuming half an hour recess is allowed him in the middle of the day, is read on scale A opposite the hour on scale B at which he quits work. For instance, if he begins work at 7:30 a. m. and stops at 5 p. m., the arrow at the end of scale A is set at 7:30 a. m. on scale B, the numeral 9 then appearing on scale A opposite 5 p. m. on scale B and showing that the employee is to be credited with 9 hrs. (See Fig. 2.) The half an hour recess time is automatically deducted from the total by making one of the main units near the lefthand end of scale A, for instance the unit intermediate numerals 4 and 5, equal in length to one and one-half times the length of the other units as is obvious and as has been explained.

Another example is illustrated in Fig. 3, assuming that 7:30 a. m. to 5 p. m. are the regular working hours, that the employee is allowed one-half hour recess in the middle of the day without pay and that he is credited with time and one-half for work done after 5 p. m. If he begins work at 8 a. m. and quits at 6:30 p. m. the number of hours with which he is to be credited is determined as follows:

The arrow at the lefthand end of scale A is set at 8 a. m. on scale B. The number of hours with which the employee would be credited if he stopped work at 5 p. m. is read on scale A opposite that hour on scale B and shows 8½. Scale C is then set with its 8½ hour mark in alinement with 5 p. m. on scale B and the number of hours with which the employee is to be credited including " overtime " is read on scale C opposite the stopping time on scale B, to wit: 6:30 p. m., which is 10.75 hours or in other words, ten hours and three-quarters.

Still a further example is illustrated by Fig. 4 which, we will assume, is calculated on Saturday when the regular time ordinarily ends at 1 p. m. Assuming the employee begins work at 7:30 a. m. and quits at 4 p. m., the number of hours to be credited to him is calculated by first setting the arrow at the end of scale A opposite 7:30 a. m. on scale B. The number of hours with which the employee would be credited if he stopped work at 1 p. m. is then read on scale A opposite that hour on scale B and shows five. The five hour mark on scale C is then brought into register with 1 p. m. on scale B and the number of hours to be credited including overtime is read on scale C opposite the quitting time or opposite 4 p. m. on scale B and shows 9½ or in other words nine and one-half hours.

In Fig. 5 I have shown a slight modification wherein the length of the units on upper scale C' is but one-half the length of the units on the other scale. This modification is for use when the employee is credited with "double" time for overtime instead of time and one-half so that the ratio between the length of the units of scale C' and the units of the other scales is 1 to 2 instead of 2 to 3 as in the previous cases. Obviously, the length of the units of the scale C' may be varied as compared with the length of the units of the other scales depending on the amount of regular time with which he is credited for overtime work.

Fig. 6 shows a modification on lower scale A' wherein the unit intermediate numerals 4 and 5 is twice the length of the other units and is used when an hour recess or lunch-time is deducted from the day's work. Obviously this specific unit does not have to be placed between the numerals 4 and 5 in this or in the previous cases but could appear at other places near the left-hand end of the scale A' as for instance between the numerals 3 and 4 or 2 and 3. It could not very well be placed at or near the righthand end of the scale as then, in some cases, the automatic deduction of the recess hour would not be made particularly if the working day were a short one. Obviously, the ratio between the length of this particular unit with the length of the other units depends on the amount of recess or lunch-time the employee is allowed.

What I claim as my invention is:—

1. An apparatus for calculating the working time of an employee consisting of a "clock" scale divided into units of equal length representing the hours of the day, a "regular time" scale divided into units representing hours and equal to the units of said clock scale, and an "overtime" scale divided into equal units representing hours, the ratio between the length of the units of said overtime scale and said clock scale being dependent on the amount of time per hour with which the employee is credited for hours or fractions thereof worked after the close of the working day and the units of said regular time scale and said overtime being adapted to register with the units of said clock scale.

2. An apparatus for calculating the working time of an employee consisting of a "clock" scale divided into equal units representing the hours of the day, a "regular time" scale divided into units representing hours all of which units are of equal length but one, the ratio between the length of said one unit and the other units being dependent on the amount of recess time the employee is allowed during the day but with which he is not credited, and an "overtime" scale divided into equal units representing hours, the ratio between the length of the units of said overtime scale and said clock scale being dependent on the amount of time per hour with which the employee is credited for hours or fractions thereof worked after the close of the working day and the units of said regular time scale and said overtime scale being adapted to register with the units of said clock scale.

Signed at New York in the county of New York and State of New York this 18th day of March A. D. 1919.

ERICH BÖHNKE.

Witnesses:
F. B. TOWNSEND,
IRENE LEFKOWITZ.